(12) United States Patent
Hoshi

(10) Patent No.: US 6,831,783 B2
(45) Date of Patent: Dec. 14, 2004

(54) DIFFRACTIVE OPTICAL ELEMENT AND OPTICAL SYSTEM

(75) Inventor: Hikaru Hoshi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/871,638

(22) Filed: Jun. 4, 2001

(65) Prior Publication Data

US 2002/0012171 A1 Jan. 31, 2002

(30) Foreign Application Priority Data

Jun. 7, 2000 (JP) .................................... 2000-171101

(51) Int. Cl.[7] .............................................. G02B 5/18
(52) U.S. Cl. .................. 359/569; 359/576; 359/566; 359/649; 359/571
(58) Field of Search ................ 359/649–651, 359/576, 566, 571, 569, 575

(56) References Cited

U.S. PATENT DOCUMENTS

| | | | |
|---|---|---|---|
| 5,044,706 A | 9/1991 | Chen | |
| 5,450,376 A | 9/1995 | Matsumura et al. | |
| 5,610,897 A | 3/1997 | Yamamoto et al. | |
| 5,790,321 A | 8/1998 | Goto | |
| 6,011,651 A | 1/2000 | Kamo | |
| 6,122,104 A | 9/2000 | Nakai | |
| 6,157,488 A | 12/2000 | Ishii | |
| 6,215,596 B1 | 4/2001 | Araki et al. | |
| 6,262,846 B1 | 7/2001 | Nakai | |
| 6,621,640 B2 * | 9/2003 | Kobayashi | 359/649 |
| 2001/0015848 A1 | 8/2001 | Nakai | |

FOREIGN PATENT DOCUMENTS

| | | | |
|---|---|---|---|
| EP | 0898182 A2 * | 8/1998 | 359/576 |
| EP | 0 902 304 | 3/1999 | |
| JP | 4-213421 | 8/1992 | |
| JP | 6-324262 | 11/1994 | |
| JP | 8-220482 | 8/1996 | |
| JP | 9-127322 | 5/1997 | |
| JP | 10-104411 | 4/1998 | |
| JP | 10-133149 | 5/1998 | |
| JP | 11-044808 | 2/1999 | |
| JP | 11-64616 | 3/1999 | |
| JP | 11-084118 | 3/1999 | |
| JP | 2000-098118 | 4/2000 | |

OTHER PUBLICATIONS

Londoño, et al., "The Design of Achromatized Hybrid Diffractive Lens Systems," SPIE vol. 1354, International Lens Design Conference, pp. 30–37 (1990).
Kathman, et al., "Binary Optics in Lens Design," SPIE vol. 1354, International Lens Design Conference, pp. 297–309 (1990).
Wood, "Using Hybrid Refractive–Diffractive Elements in Infrared Petzval Objectives," SPIE vol. 1354, International Lens Design Conference, pp. 316–322 (1990).

* cited by examiner

Primary Examiner—Fayez Assaf
(74) Attorney, Agent, or Firm—Fitzpatrick, Cella, Harper & Scinto

(57) ABSTRACT

A diffractive optical element includes a first layer having a relief-type grating, a second layer having a relief-type grating, and a third layer having a relief-type grating. The first, second and third layers are formed of different materials. The diffractive optical element has at least three diffraction optical parts in the boundary areas of the respective layers. The diffractive optical element is set so that at least wavelengths, the diffraction efficiency thereof for diffracted light of a predetermined order may be maximum. The three wavelengths are substantially coincident with the main wavelengths of the three primary colors.

2 Claims, 9 Drawing Sheets

DIFFRACTIVE OPTICAL ELEMENT AND OPTICAL SYSTEM

BACKGROUND OF THE INVENTION

1. Field of the Invention

This invention relates to a diffraction optical element and an optical system having the diffraction optical element, and particularly to a diffraction optical element for use in light of a plurality of wavelengths or bands and an optical system using the same.

2. Related Background Art

In a refracting optical system, use has heretofore been made of a method of decreasing chromatic aberration by a combination of glass materials differing in dispersion. In contrast, a method of decreasing chromatic aberration by providing a diffractive optical element (hereinafter referred to also as DOE) having the diffracting action on a lens surface or in a portion of an optical system is disclosed in such literature as SPIE, Vol. 1354, International Lens Design Conference (1990), Japanese Patent Application Laid-Open No. 4-213421 (corresponding U.S. Pat. No. 5,044,706), Japanese Patent Application Laid-Open No. 6-324262, etc. These utilize the physical phenomenon that on the refracting part and the diffracting part of the optical system, chromatic aberration appears in opposite directions.

Further, such DOE can also be given an effect like that of an aspherical lens by varying the period of the periodic structure thereof, and is greatly effective to reduce aberrations.

On the other hand, a ray refracted by a refracting surface is still a ray after being refracted, whereas in the DOE, a ray has the nature that the ray is divided into lights of respective orders after being refracted. Therefore, when the DOE is used in a lens system, such grating design that a beam of a wavelength area used concentrates in a particular order (hereinafter referred to also as the design order) is indenspensable. Specifically, it is necessary that, in the entire area of the wavelength used in the system, the diffraction efficiency of a ray of the design order be sufficiently high.

When there is present a ray having other diffraction order than the design order, it becomes a flare light which adversely affects image performance at a location whereat light of the original design order is imaged. Accordingly, what is important in the construction of an optical system using the DOE is to sufficiently take into consideration the spectral distribution of the diffraction efficiency at the design order and the behavior of rays of other orders than the design order.

The characteristic of the diffraction efficiency of a DOE as shown in FIG. 10 of the accompanying drawings for diffracted light of the particular diffraction order is shown in FIG. 11 of the accompanying drawings. In FIG. 10, the DOE 1 is such that on a substrate (base) 2, a phase-type diffraction grating 4 formed of a predetermined material is formed into a sawtooth cross-sectional shape with a grating height (depth) d.

The value of the diffraction efficiency is the rate of the quantity of each diffracted light to the entire transmitted beam, and is a value not taking the reflection or the like on the boundary surface of the grating into account because description will become complicated if it is taken into account. In FIG. 11, the axis of abscissas represents wavelength and the axis of ordinates represents diffraction efficiency. This DOE is designed such that in the first diffraction order (solid line in FIG. 11), diffraction efficiency becomes highest in the wavelength area used (that is, the design order is the first order).

Further, the diffraction efficiency for the diffraction orders in the vicinity of the design order (zero order and second order with respect to the + first order (design order)) is also shown. As shown in FIG. 11, at the design order, the diffraction efficiency becomes highest for a certain wavelength (hereinafter referred to as the design wavelength) and gradually becomes lower for the other wavelengths. The amount of reduction in the diffraction efficiency of the design order for the other wavelengths than the design wavelength becomes diffracted lights of the other orders and becomes a factor of flare. Also, when a plurality of DOE's are used, the reduction in the diffraction efficiency also leads to a reduction in transmittance.

Various propositions have been made as constructions for restraining the reduction in the diffraction efficiency for the other wavelengths than the design wavelength which becomes such a factor of flare. In a construction disclosed in Japanese Patent Application Laid-Open No. 9-127322 (corresponding U.S. Pat. No. 6,157,488), as shown in FIG. 12 of the accompanying drawings, three different materials and two different grating thicknesses (d1 and d2) are optimally chosen and are disposed in proximity to each other at equal pitch distributions to thereby realize high diffraction efficiency in the entire visible area of the design order, as shown in FIG. 13 of the accompanying drawings.

Also, Japanese Patent Application Laid-Open No. 10-133149 discloses a DOE having a laminated cross-sectional shape in which diffraction gratings are superposed in two layers, as shown in FIG. 14 of the accompanying drawings. The refractive indices, dispersion characteristics and grating thicknesses of materials forming the diffraction gratings of the two layers are optimized to thereby realize high diffraction efficiency in the entire visible area of the design order.

Also, Japanese Patent Application Laid-Open No. 8-220482 presents a construction in a relief-type DOE having a sawtooth cross-sectional shape in which flare caused by the wavelength dependency of diffraction efficiency is improved. That is, the relief pattern surface of the DOE is divided into areas and the optimization of the depth of grooves in the relief pattern surface of the pertinent area is effected so that diffraction efficiency may become maximum for the central wavelength of light passing through the pertinent area. In addition, as shown in FIG. 15 of the accompanying drawings, diffraction efficiency is improved in the vicinity of the design wavelengths $\lambda a$, $\lambda b$ and $\lambda c$ to thereby reduce flare. Also, in Japanese Patent Application Laid-Open No. 10-104411 (corresponding to U.S. Pat. No. 6,011,651), the design wavelength of a kinoform-type diffractive optical element as shown in FIG. 10 of the accompanying drawings is set to a suitable value at which it is difficult for color flare to be conspicuous, and specifically the grating thickness is adjusted, thereby reducing the quantity of unnecessary diffracted lights in the vicinity of the design wavelength.

However, in the above-mentioned Japanese Patent Application Laid-Open No. 9-127322 and Japanese Patent Application Laid-Open No. 10-133149, it is only described that the diffraction efficiency for the design order is greatly improved and therefore unnecessary diffracted lights of the other orders than the design order are greatly reduced and flare is decreased, and there is no detailed description of the color taste of flare and the amount of flare.

On the other hand, Japanese Patent Application Laid-Open No. 8-220482 shows a construction in which in a DOE of single layer construction (hereinafter referred to as the single layer DOE) provided by a relief-type diffraction grating having a sawtooth-like cross-sectional shape, the central wavelength of transmitted light through each area is the design wavelength, whereby the wavelength dependency of diffraction efficiency is reduced, but there is made no description of a DOE having a laminated cross-sectional shape (hereinafter referred to as the laminated DOE) in which diffraction gratings are superposed in two or more layers.

Also, Japanese Patent Application Laid-Open No. 10-104411 bears a description of the influence, etc. of the color flare of lights of unnecessary orders, but the DOE used in the description is a single layer DOE as shown in FIG. 10, and no mention is made of the flare regarding the single layer DOE.

In an optical system using the aforedescribed laminated DOE, in contrast with the single layer DOE, flare is greatly reduced, but it cannot be said that unnecessary diffracted lights are not at all present, and slightly, unnecessary diffracted lights remain. In the application of the laminated DOE to an optical system in which the photographing (projecting) condition does not change (for example, the reader lens of a copier or the projection lens of a liquid crystal projector), the influence of flare can be restrained to a problem-free level by the laminated DOE. In contrast, in an optical system for photographing an object under various conditions such as a camera or a video camera, it has become apparent that the slightly remaining flare poses a problem. Particularly when the flare component has wavelength dependency, color flare similar to that in the single layer DOE of Japanese Patent Application Laid-Open No. 10-104411 occurs. On the other hand, in the laminated DOE of Japanese Patent Application Laid-Open No. 11-64616 (corresponding to U.S. Pat. No. 6,122,104), there are three or more design wavelengths which are wavelengths (peak wavelengths) for which diffraction efficiency becomes maximum. According to this DOE, the occurrence of color flare is considerably restrained.

SUMMARY OF THE INVENTION

So, the present invention has as its object to provide a diffractive optical element improved over the element of Japanese Patent Application Laid-Open No. 11-64616 and an optical system having such diffractive optical element.

In order to achieve the above object, in the diffractive optical element of the present invention, three layers each having a relief-type grating are formed of different materials, and at least three diffraction optical parts are provided in the boundary areas of the respective layers. The diffractive optical element is characterized in that the material forming each layer and the grating height are appropriately set so that in three wavelengths which are the main wavelengths of the three primary colors, the diffraction efficiency for diffracted light of a predetermined order may be maximum.

Here, when the diffractive optical element of the present invention is used in an optical system for forming an image on the photosensitive surface of silver salt film, an image pickup element or the like, the main wavelengths of the three primary colors refer to the main wavelengths of color lights for which the spectral sensitivity of the photosensitive surface is high. Also, when the diffractive optical element of the present invention is used in an optical system for illuminating an original picture with light from a light source, and projecting the image of the illuminated original picture, the main wavelengths of the three primary colors refer to the main wavelengths of color lights included in the light from the light source.

DESCRIPTION OF THE PREFERRED EMBODIMENTS

Some embodiments of the present invention will hereinafter be described.

Embodiment 1

Figure 1:
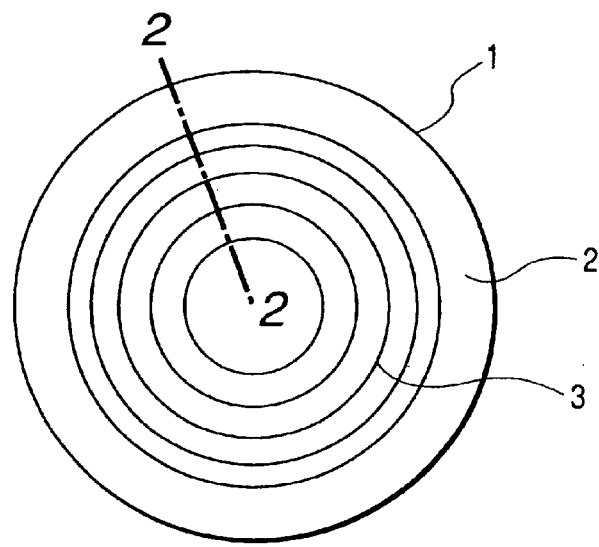
FIG. 1 is a front view of a diffractive optical element according to Embodiment 1 of the present invention.
Figure 2:
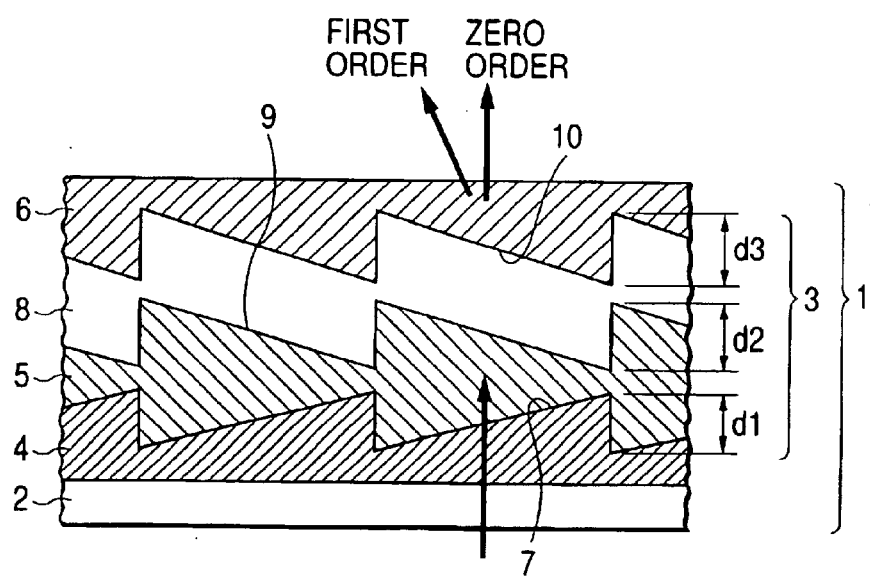
FIG. 2 shows a fragmentary cross-sectional shape of the diffractive optical element on the cross-section 2—2 of FIG. 1.

FIG. 1 is a front view showing the construction of a diffractive optical element (DOE) according to Embodiment 1 of the present invention. In FIG. 1, the DOE 1 is of a construction in which a phase-type (relief-type) diffraction grating 3 is made on the surface of a substrate 2. FIG. 2 shows a part of a cross-sectional shape taken on the section 2—2 of the diffractive optical element of FIG. 1. FIG. 2 is a view considerably more emphasized in the direction of the grating height (depth) than actual in order to make it easily understood.

The cross-sectional shape of the DOE according to the present embodiment is comprised of a laminated structure formed of three materials of a first layer 4, a second layer 5 and a third layer 6 differing in dispersion and provided on the substrate 2. The DOE further has a structure comprising a first diffraction grating having a diffraction grating surface 7 of a grating height d1 in the boundary area between the first layer 4 and the second layer 5, a second diffraction grating having a diffraction grating surface 9 of a grating height d2 in the boundary area between the second layer 5 and an air layer 8, and a third diffraction grating having a diffraction grating surface 10 of a grating height d3 in the boundary area between the third layer 6 and the air layer 8.

While in FIG. 2, the diffraction grating surface 9 and the diffraction grating surface 10 are formed in the boundary areas with respect to the air, this is not restrictive, but the area between the diffraction grating surface 7 and the diffraction grating surface 9 may be an air layer, or the construction does not matter if the diffractive optical element is one having three or more diffraction grating surfaces formed of a combination of three or more different materials.

Figure 16:
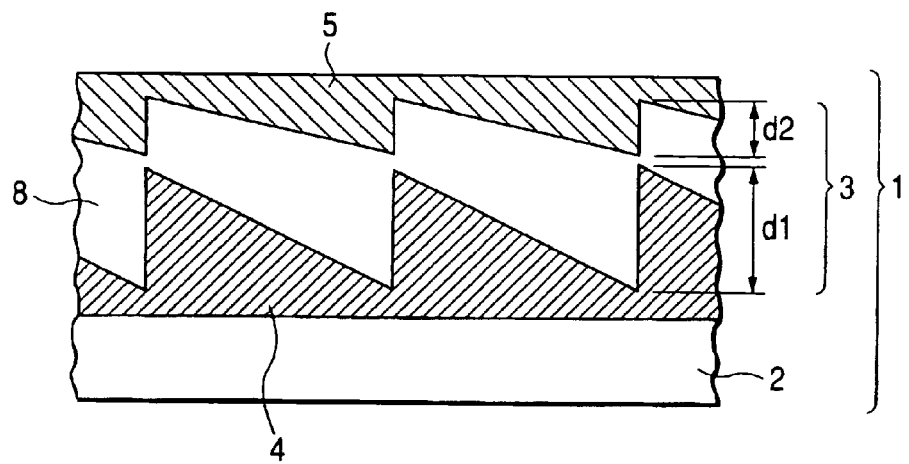
FIG. 16 shows a cross-sectional shape of a laminated-type diffractive optical element according to the prior art.

Description will now be made of unnecessary order lights created by the DOE which are the cause of color flare. In order to describe the diffraction efficiency of the unnecessary order lights, consider a heretofore known laminated DOE of two layers shown in FIG. 16. Herein, a case where ultraviolet setting resin C 001 (refractive index nd=1.524, Abbe number vd=50.9) produced by Dainippon Ink Chemical Industry Ltd. is used for the first layer 4 and another ultraviolet setting resin (nd=1.636, vd=22.8) is used for the second layer 5 is taken as an example. The design order is + first order, the grating thickness d1 of the first diffraction grating is 9.5 μm, and the grating thickness d2 of the second diffraction grating is 6.9 μm. In FIG. 16, the reference numerals 2 and 8 designate a substrate and an air layer, respectively, and are similar in significance to those in FIG. 2.

Figure 17:
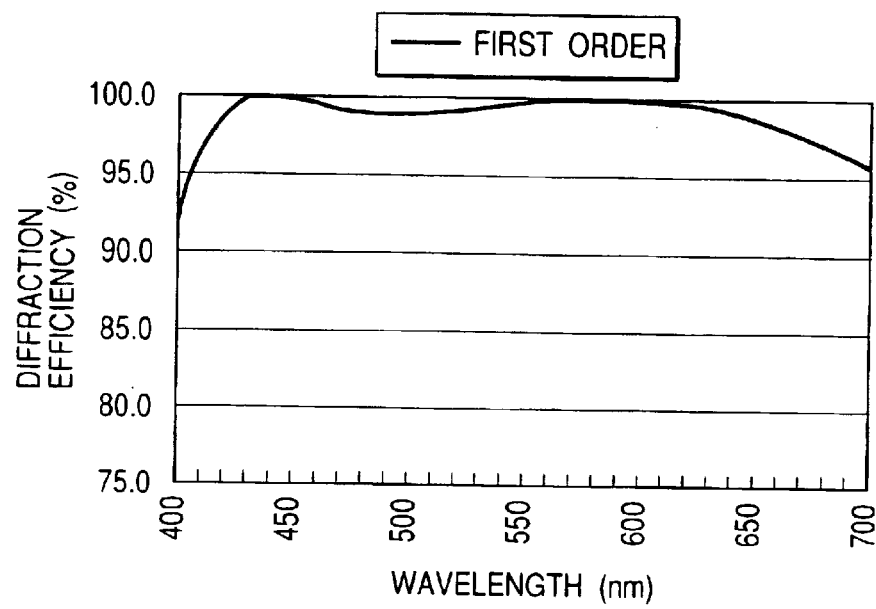
FIG. 17 is a graph showing the diffraction efficiency of the diffractive optical element of FIG. 16 for the design order.

The diffraction efficiency of the DOE of FIG. 16 at the design order is shown in FIG. 17.

Figure 18:
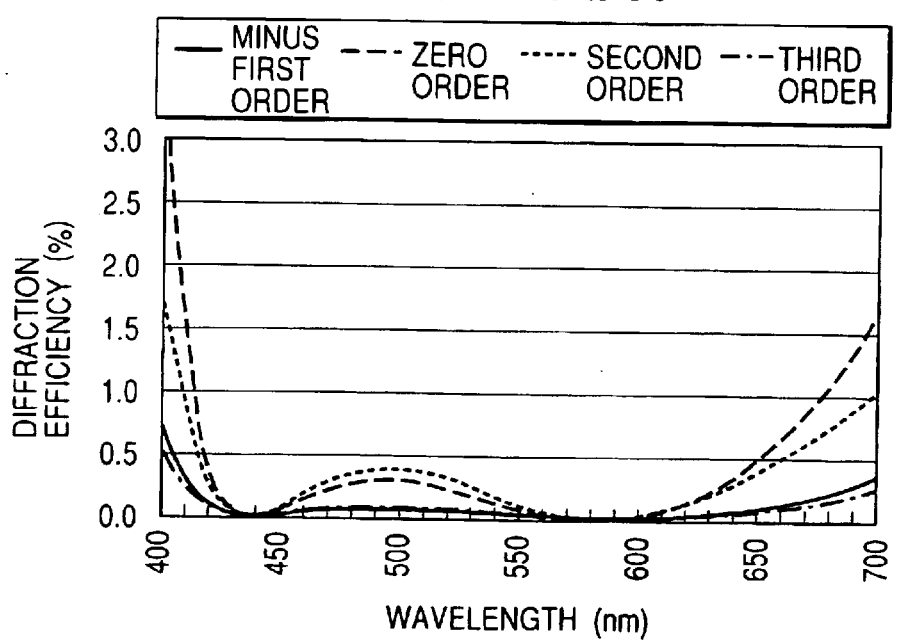
FIG. 18 is a graph showing the diffraction efficiency of the diffractive optical element of FIG. 16 for unnecessary order lights.

In this example, there are two design wavelengths in the visible region, and from the short wavelength side, they are 438 nm and 588 nm in succession. It will be seen that as shown in FIG. 17, the diffraction efficiency is 100% at the design wavelengths 438 nm and 588 nm. Also, the diffraction efficiency for unnecessary order lights is shown in FIG. 18. At the design wavelengths, unnecessary order lights are not created, and it will be seen that when the diffraction efficiency for the + first order light which is the design order light is reduced, the diffraction efficiency for diffracted lights of the other orders than the + first order is increased. This shows that in the other wavelengths than the design wavelengths, flare is caused by the other unnecessary order lights than the design order light.

Description will now be made of the diffraction efficiency of the DOE according to the present embodiment shown in FIGS. 1 and 2 at the design order and the unnecessary order lights.

Figure 3:
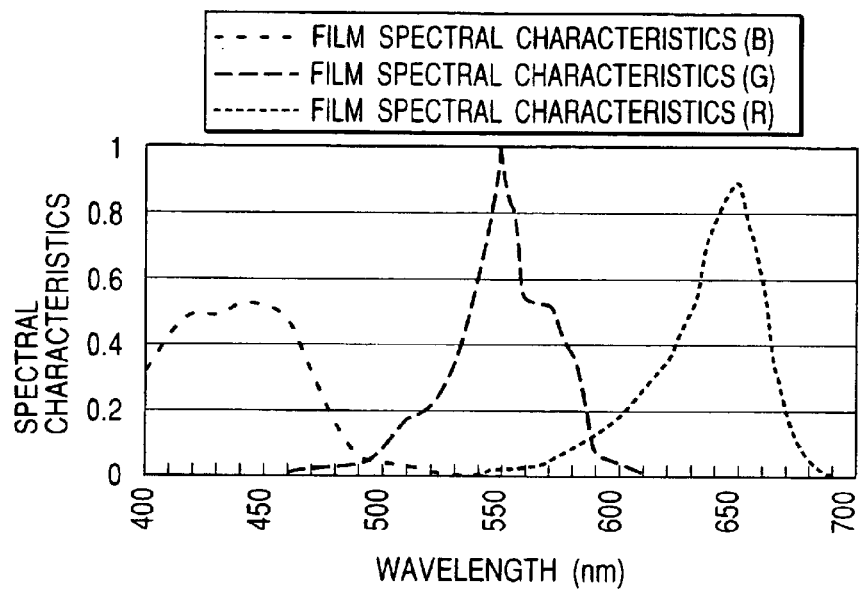
FIG. 3 is a graph showing the spectral sensitivity characteristic of silver salt film.

In the DOE of the present invention, the design wavelengths are made coincident with the main wavelengths of the three primary colors. Particularly in the present embodiment, the design wavelengths are made coincident with the main wavelengths of the three primary colors R, G and B (red, green and blue) which are high in sensitivity on ordinary silver salt film. The spectral characteristic of the silver salt film is shown in FIG. 3. It will be seen from this figure that the main wavelengths of the three primary colors R, G and B which are high in sensitivity on the silver salt film are $\lambda B=450$ nm, $\lambda G=550$ nm and $\lambda R=650$ nm from the short wavelength side. When the design wavelengths of the diffractive optical element are made coincident with the main wavelengths of the three primary colors, assuming that in FIG. 2, PMMA (nd=1.492, vd=57.4), first ultraviolet setting resin (nd=1.636, vd=22.8) and second ultraviolet setting resin (nd=1.598, vd=28.0) are used for the first layer 4, the second layer 5 and the third layer 6, respectively, and the design order is the first order, the grating thickness d1 of the first diffraction grating, the grating thickness d2 of the second diffraction grating and the grating thickness d3 of the third diffraction grating become 34.9 μm, 23.2 μm and 52.4 μm, respectively.

Figure 4:
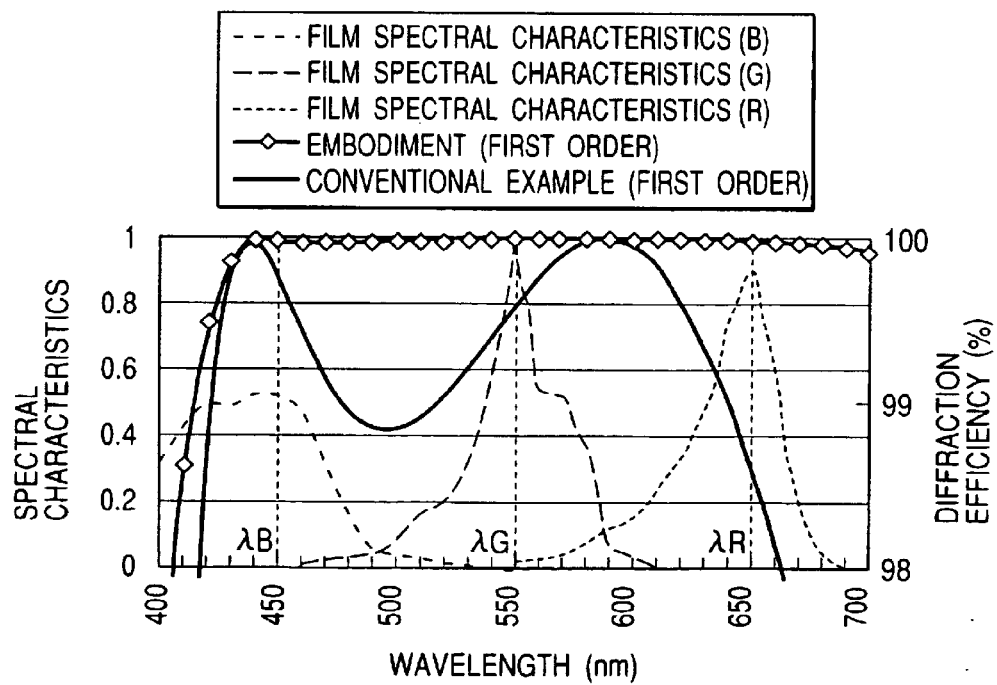
FIG. 4 is a graph showing the diffraction efficiency of the diffractive optical element according to Embodiment 1 at the design order and the spectral characteristic of the silver salt film.

FIG. 4 shows the spectral characteristics of silver salt film for the three primary colors, and the diffraction efficiency of the DOE according to the present embodiment and the DOE according to the prior art shown in FIG. 16 at the design order. In FIG. 4, the axis of abscissas represents wavelength, the left axis represents the spectral characteristic of the silver salt film, and the right axis represents diffraction efficiency. It will be seen from FIG. 4 that in the DOE according to the present embodiment, high diffraction efficiency is obtained at all of the main wavelengths of the three primary colors.

Figure 5:
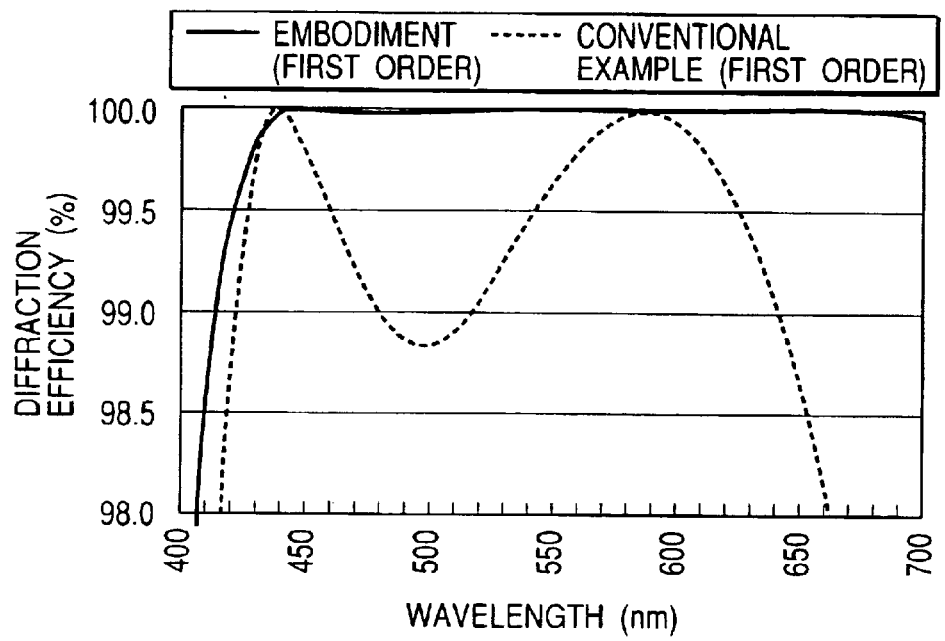
FIG. 5 is a graph showing the diffraction efficiency of the diffractive optical elements according to Embodiment 1 and the prior art at the design order.
Figure 6:
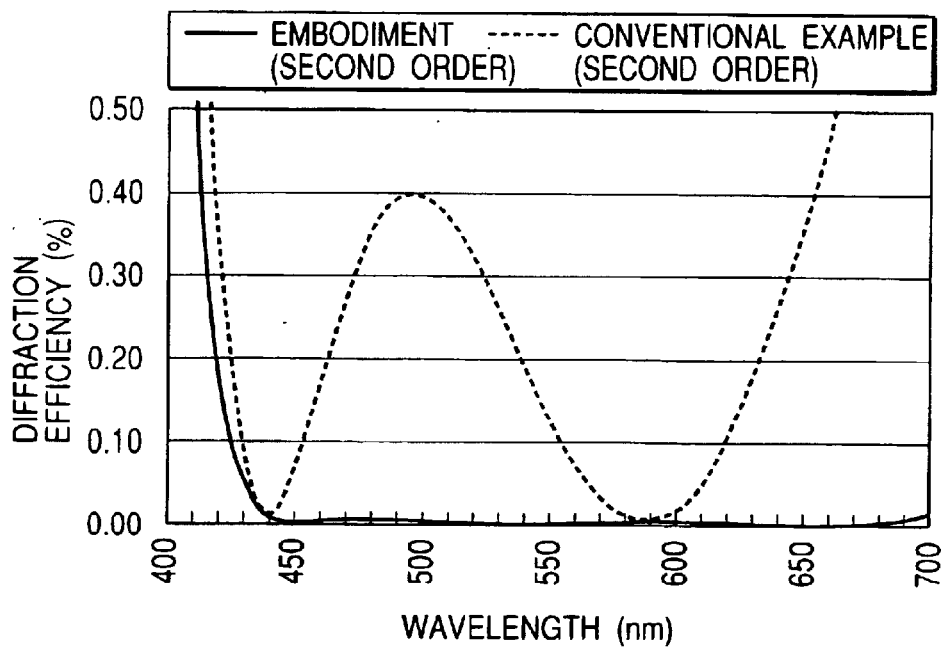
FIG. 6 is a graph showing the diffraction efficiency of the diffractive optical elements according to Embodiment 1 and the prior art for unnecessary order light.

FIG. 5 shows only the diffraction efficiency of the DOE's according to the present embodiment and the prior art at the design order picked out from FIG. 4 and compares them with each other. It will be seen that as compared with the DOE according to the prior art, the DOE according to the present embodiment is greatly improved in diffraction efficiency. FIG. 6 shows the diffraction efficiency of the DOE's according to the prior art and the present embodiment for the diffracted light of unnecessary order (second order). From FIG. 6, the DOE according to the present embodiment is greatly reduced in unnecessary diffracted light as compared with the conventional example and therefore, the flare caused by the unnecessary diffracted light can also be greatly reduced.

Further, what should be mentioned specially is that as compared with the conventional example, in the present embodiment, the irregularity of the diffraction efficiency at each wavelength of the unnecessary order light is restrained. This means that the irregularity of the diffraction efficiency for the other order lights than the design wavelength caused by a manufacturing error, for example, an error of the grating thickness, becomes more allowable than in the prior art, and the provision of products easy to manufacture and high in quality can be expected.

While in the present embodiment, the main wavelengths of the three primary colors are the spectral characteristics of the silver salt film, this is not restrictive, but the characteristics of an image pickup element such as a CCD may be used as the main wavelengths. Also, the three design wavelengths need not strictly be coincident with the main wavelengths of the three primary colors, and specifically, they can be coincident with the main wavelengths of the three primary colors within the range of ±20 nm. Also, when the silver salt film has the spectral characteristics of three or more colors, for example, the silver salt film may have four photosensitive layers having different spectral characteristics, and when there exist three or more main wavelengths of a color image, the design wavelengths of the DOE may be made coincident with three or more main wavelengths.

As described above, by the design wavelengths of the DOE being made coincident with the main wavelengths of the three primary colors of a color image, there can be provided an optical element of high performance and high quality which realizes a great improvement in color flare and the restraint of the irregularity of diffraction efficiency for each wavelength caused by a manufacturing error.

Figure 7:
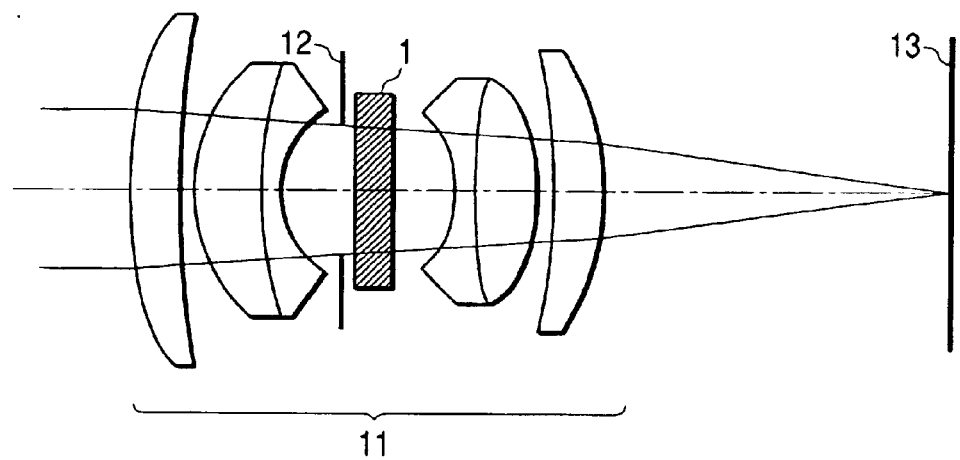
FIG. 7 is a schematic view of a color image photographing optical system according to Embodiment 1.

An optical system to which Embodiment 1 is applied is shown in FIG. 7.

FIG. 7 shows a cross-section of the photographing optical system of a camera or the like, and in FIG. 7, the reference numeral 11 designates a taking lens having a stop 12 and the DOE 1 shown in FIGS. 1 and 2, and a photosensitive surface such as silver salt film is provided on an imaging plane 13.

This optical system is of laminated structure and is greatly improved in the wavelength dependency of diffraction efficiency by the design wavelengths being made coincident with the main wavelengths of the three primary colors of a color image, and the change in the diffraction efficiency at each wavelength by a manufacturing error during the manufacture of the element is expected to be small and therefore, there can be provided a taking lens of high performance and high quality in which flare is little and the resolving power at low frequencies is high.

While in FIG. 7, the DOE is provided on a flat plate near the stop, this is not restrictive, but the DOE may be provided on the curved surface of the lens or a plurality of DOE's may be provided in the photographing optical system. Also, while in FIG. 7, the silver salt film is disposed on the imaging plane, this is not restrictive, but an image pickup element such as a CCD or a CMOS may be used. Also, while the design wavelengths of the DOE are made coincident with the main wavelengths of the three primary colors of a color image, this is not restrictive, but the design wavelengths may be substantially coincident with the main wavelengths of the three primary colors. Also, in some cases, the design wavelengths may be made coincident with more than three main wavelengths. In addition, in the above-described embodiment, it is preferable to take the imaged state on the evaluation surface of color flare into consideration in order to provide the color taste of color flare lower in the attention property.

Also, while in the present embodiment, the case of the taking lens of a camera has been shown, this is not restrictive, but the DOE of the present invention may be used in an imaging optical system used in a wide wavelength region such as the taking lens of a video camera, the image scanner of a business machine or the reader lens of a digital copier to obtain a similar effect.

Embodiment 2

Figure 8:
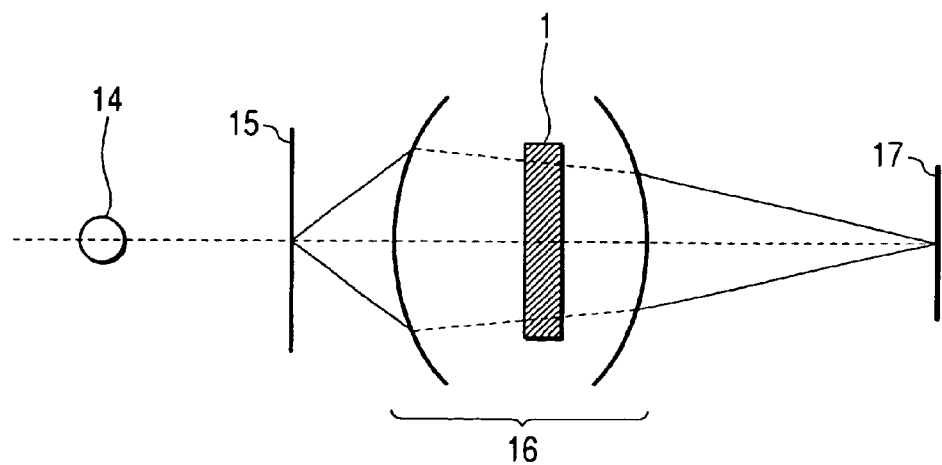
FIG. 8 is a schematic view of a color image inputting optical system according to Embodiment 2.

The construction of Embodiment 2 of the present invention is shown in FIG. 8. FIG. 8 is a cross-sectional view of a color image inputting optical system such as a film scanner, and the reference numeral 14 designates an illuminating lamp such as an LED or a cold cathode tube, the reference numeral 15 denotes film, and the reference numeral 16 designates an imaging optical system having therein the DOE 1 described in Embodiment 1. The reference numeral 17 denotes an imaging plane on which a CCD is disposed. According to the present embodiment, there can be provided a film scanner of high performance in which the DOE is made into laminated structure to thereby greatly improve the wavelength dependency of diffraction efficiency and the design wavelengths are made coincident with the main wavelengths of the three primary colors of the light source to thereby reduce color flare and which is good in color reproducibility. To add, it is preferable to make the design wavelengths coincident with the main wavelengths of the three primary colors after taking into consideration the sensitivity of the CCD at each wavelength, the transmittance of the optical system at each wavelength, and the main wavelengths of the three primary colors of the light source.

Embodiment 3

Figure 9:
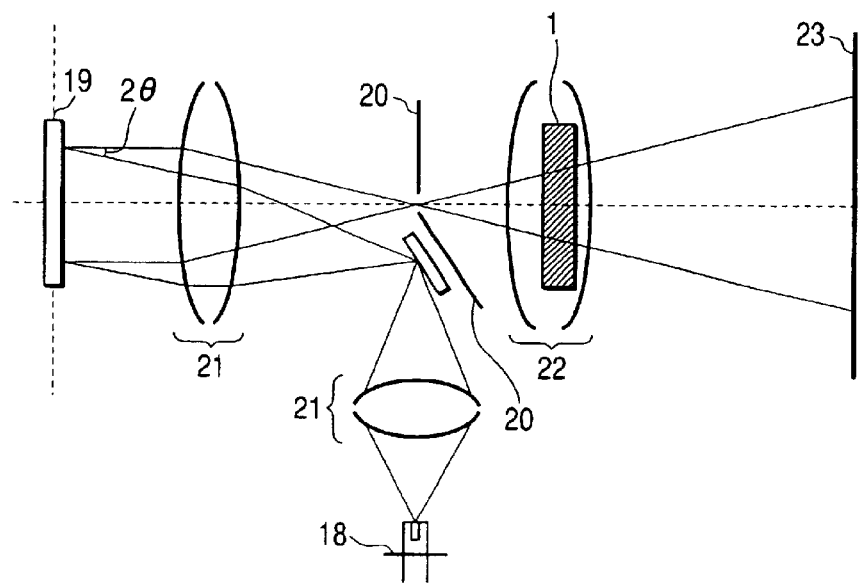
FIG. 9 is a schematic view of a color image projection optical system according to Embodiment 3.
Figure 10:
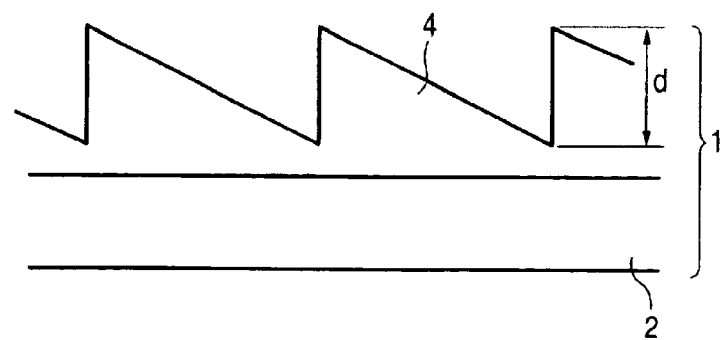
FIG. 10 shows a cross-sectional shape of a single layer type diffractive optical element according to the prior art.
Figure 11:
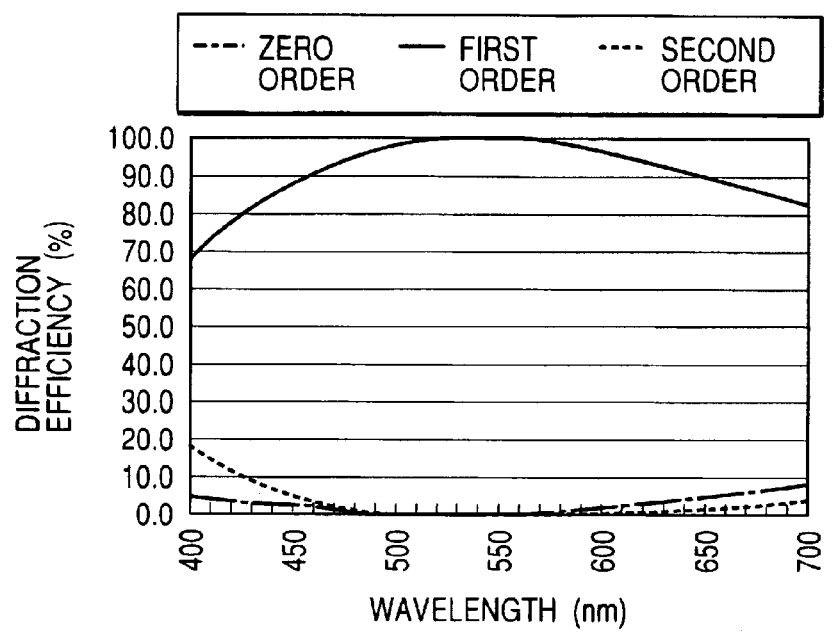
FIG. 11 is a graph showing the diffraction efficiency of the diffractive optical element of FIG. 10.
Figure 12:
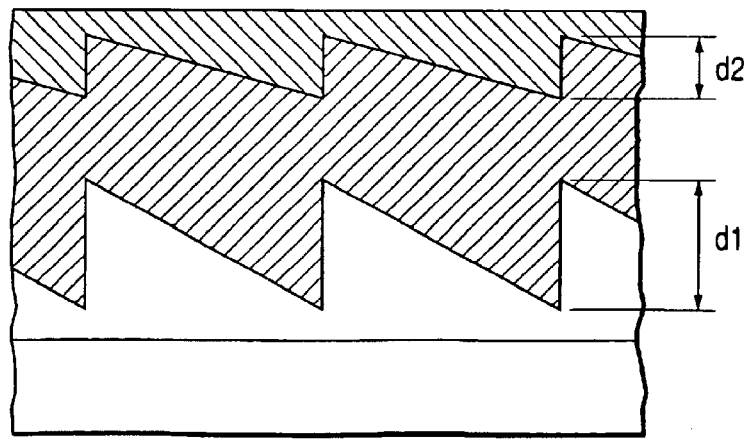
FIG. 12 shows a cross-sectional shape of a laminated-type diffractive optical element according to the prior art.
Figure 13:
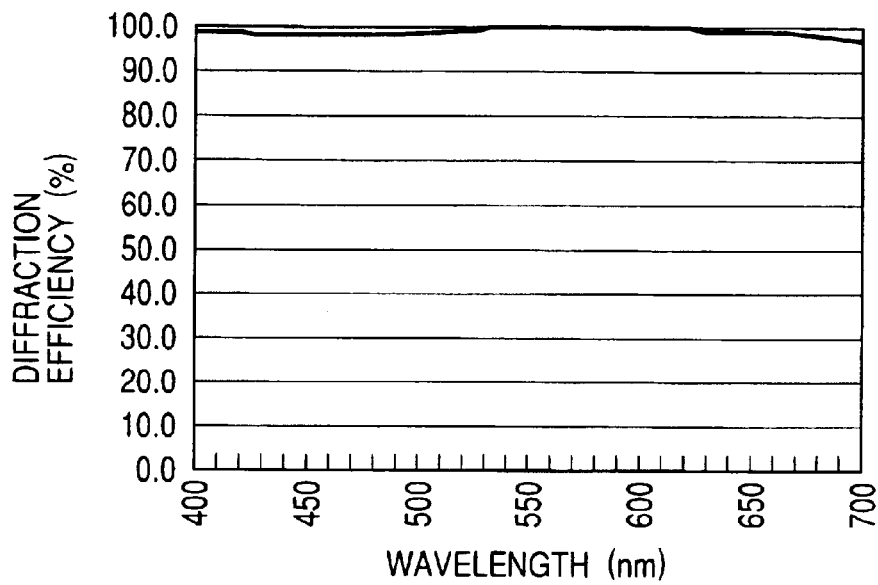
FIG. 13 is a graph showing the diffraction efficiency of the diffractive optical element of FIG. 12.
Figure 14:
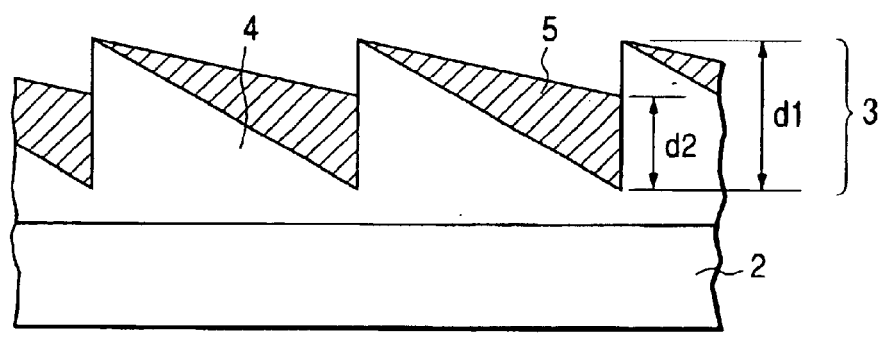
FIG. 14 shows a cross-sectional shape of a laminated-type diffractive optical element according to the prior art.
Figure 15:
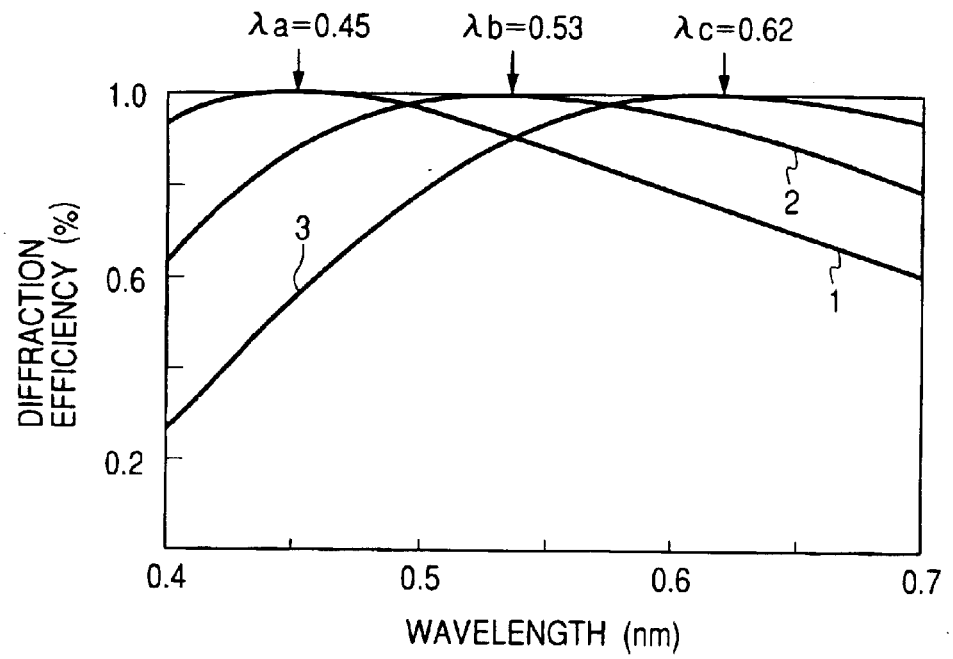
FIG. 15 is a graph showing the diffraction efficiency of a single-layer-type diffractive optical element according to the prior art.

The construction of Embodiment 3 of the present invention is shown in FIG. 9. FIG. 9 shows a cross-section of a color image displaying optical system, and the reference numeral 18 designates a monochromatic light source such as a laser, the reference numeral 19 denotes a DMD (digital micromirror device) which is a reflection type light modulating element, the reference numeral 20 designates a light intercepting surface, the reference numeral 21 denotes an optical system, the reference numeral 22 designates a projection optical system having therein the DOE1 according to Embodiment 1, and the reference numeral 23 denotes a screen. Although in FIG. 9, for simplification, there is shown an optical system in which only one monochromatic light source such as a laser is disposed as the light source, actually it is popular to dispose as light sources monochromatic light sources correspondingly to the three colors R, G and B and use them compositely. By thus using a DOE in which the design wavelengths are made coincident with the wavelengths of the monochromatic light sources of the three primary colors, there can be provided a color displaying apparatus of high performance in which the diffraction efficiency at each wavelength is optimized and color flare is restrained.

While in the present embodiment, a monochromatic light source such as a laser is used as the light source, this is not restrictive, but a white light source may be used or a diffraction-type light modulating element such as a grating light valve may be used as the light modulating element.

Also, while in the present embodiment, the DOE is disposed in the projection optical system, this is not restrictive, but if one or more DOE's is disposed on a common optical path of the three primary color lights from the light source, the one or more DOE's may be disposed anywhere on the common optical path of the three primary color lights.

What is claimed is:

1. An optical system which projects an image using a light generated by three monochromatic light sources corresponding to three primary colors comprising:

a diffractive optical element comprising:

a first layer having a relief-type grating;

a second layer having a relief-type grating; and a third layer having a relief-type grating;

said first, second and third layers being formed of different materials;

said diffractive optical element having plural diffraction optical parts in the boundary areas of the respective layers;

said diffractive optical element being set so that, at three wavelengths, the design diffraction efficiency thereof for diffracted light of a predetermined order is 100%, said three wavelengths being substantially coincident with wavelengths of light generated by each of the three monochromatic light sources, and the wavelengths of light generated by the three monochromatic light sources being 450±20 nm, 550±20 nm and 650±20 nm.

2. The diffractive optical element of claim 1, wherein at least one air layer is included among said first, second and third layers.

* * * * *

UNITED STATES PATENT AND TRADEMARK OFFICE
CERTIFICATE OF CORRECTION

PATENT NO. : 6,831,783 B2
DATED : December 14, 2004
INVENTOR(S) : Hikaru Hoshi

It is certified that error appears in the above-identified patent and that said Letters Patent is hereby corrected as shown below:

Column 8,
Line 52, "layers;" should read -- layers; and --.

Signed and Sealed this

Thirty-first Day of May, 2005

JON W. DUDAS
*Director of the United States Patent and Trademark Office*